(No Model.)

T. W. VARLEY.
CURRENT INDICATOR.

No. 606,369. Patented June 28, 1898.

Witnesses
Chas H Smith
J. Staib

Inventor
Thomas W. Varley
by L. W. Serrell & Son
Atty

UNITED STATES PATENT OFFICE.

THOMAS W. VARLEY, OF NEW YORK, N. Y., ASSIGNOR TO HIMSELF, AND CARL P. LENK AND RUDOLPH A. LENK, OF BROOKLYN, NEW YORK.

CURRENT-INDICATOR.

SPECIFICATION forming part of Letters Patent No. 606,369, dated June 28, 1898.

Application filed July 2, 1897. Serial No. 643,253. (No model.)

*To all whom it may concern:*

Be it known that I, THOMAS W. VARLEY, a citizen of the United States, residing in the city, county, and State of New York, have invented an Improvement in Current-Indicators or Ammeters, of which the following is a specification.

Two magnetic needles have been connected in parallel positions, one directly over the other, with the poles standing in the reverse direction. In this case the magnetism of one neutralizes the magnetism of the other, and the needles would have no directive tendency. Needles of this character usually are designated as an "astatic" pair or couple, and these have sometimes been used in connection with a coil to form a galvanometer. Difficulty has heretofore been experienced in determining the strength of a current passing through a straight conductor, and still greater difficulty has been experienced in determining the direction of such current.

The object of the present invention is to construct and arrange astatic needles in such a manner as to form an indicator or ammeter for the current passing through a straight conductor, and with this object in view the upper and lower astatic needles are connected by an arch and pivoted in a case in such a manner that the case with the astatic needles can be applied with the needles in line with the conductor and the conductor between the needles. Hence such needles will be deflected one way or the other, according to the direction of current in the conductor, and from the astatic needles an arm extends to an indicator or scale for indicating the strength of the current, and the parts are inclosed in a case, so as not to be influenced by atmospheric currents, and I employ a magnet to return the needles to a normal position. This magnet may be either permanent or variable or movable, or a compensating magnet may be employed for the same object of returning the needles to their normal position.

The astatic needles are magnetized, so that the arm swings in the direction of the flow of the current, and the strength of the permanent magnet is to be such in relation to the divisions of the scale that the strength of current will be indicated in amperes, and in consequence of the shape of the case the instrument can be applied to a conductor without the case being opened.

Figure 2:
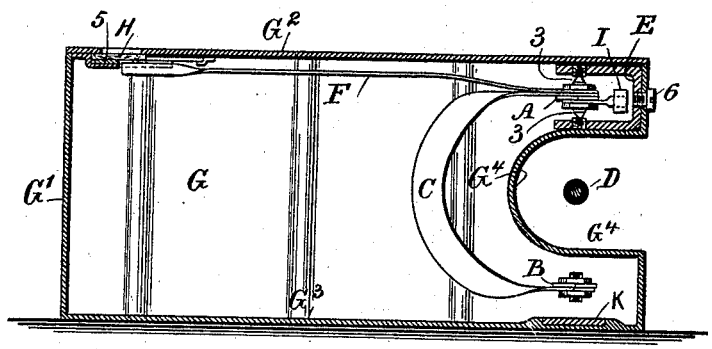
Figure 1:
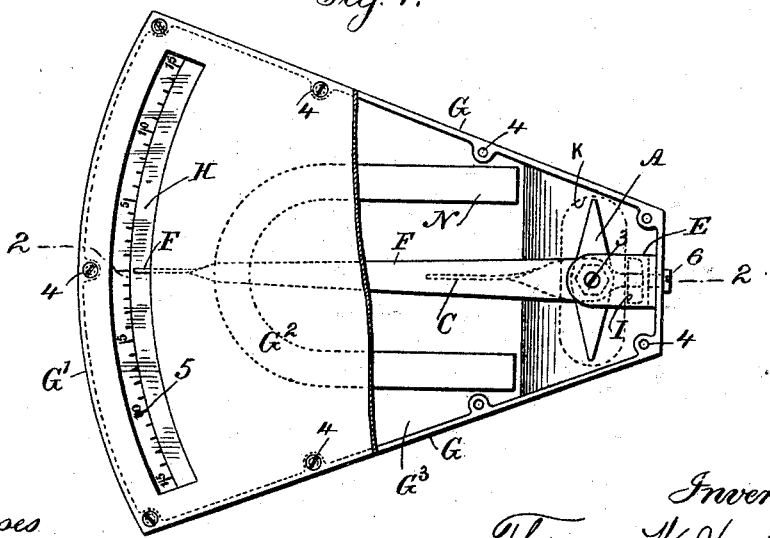

In the drawings, Figure 1 is a plan view with the case in section, and Fig. 2 is a vertical section at the line 2 2.

The upper needle A and lower needle B are united by a connecting-arch C, which arch may be of thin sheet metal or any other suitable material, and it passes off laterally a sufficient distance for allowing the conductor at D to be between the two needles and for such needles to swing freely in either direction. The needle A is provided with vertical pivots 3, by which it is supported in a yoke or frame E, and from the needle A an arm F extends, and this arm, together with the connecting-arch C, is preferably of aluminium, so as to be as light and delicate as possible, and at the same time to possess the required strength.

The north pole of needle A is over the south pole of the needle B, and the needles are of approximately the same magnetic strength, so as to be astatic.

It will now be borne in mind that when a conductor is in the line of the axis, or nearly so, between the two needles the current passing through such conductor sets up lines of magnetic force around the conductor and at right angles to the same, and these lines of magnetic force will cause the astatic needles to swing either in one direction or the other, according to the direction of the current and the consequent direction of the lines of magnetic force, and the extent of movement will be proportioned to the current.

To protect this device and to allow for easily applying the instrument to a conductor, the needles and arm are inclosed in a substantially air-tight case of suitable size and shape. I prefer to make the case with the diverging sides G, segment G', and top and bottom $G^2$ and $G^3$, and it is advantageous to connect the top by screws at 4, so as to allow for the easy removal of the same, and the case is made with a segmental recess $G^4$ between the astatic needles, so as to allow for the case being placed with the needles above and below and in line with the conductor, or nearly so, and in the case there is a glass H or other transparent material and with a graduated scale adjacent to the end of the arm F.

It is advantageous to make use of a counterpoise I at the opposite side to the arm F for causing the astatic needles to hang properly and the arm to move horizontally. The yoke E is removable from the case, together with the astatic needles and arm, and when in the case is held in position by the screw 6 or other connecting device, and it is to be understood that the case is to be of non-magnetic material.

The magnet K is of sufficient strength for returning the arm to a normal position when the needles are not acted upon, and this magnet K may be of any desired character. I have represented the same as a flat plate suitably magnetized; but for heavy currents the magnet K can be of soft iron and polarized by a permanent magnet, which may be suitably supported upon the case and adjusted so as to polarize the soft-iron bar by induction to the desired extent.

I find that a permanent magnet is sufficient for the indication of the current flowing through the conductor D to the extent of about fifteen and twenty amperes, but beyond that strength soft-iron needles may be employed and a horseshoe-magnet to polarize the needles by induction, such horseshoe-magnets being in reverse and secured to the bottom and cover, respectively. One of such magnets is shown at N.

I claim as my invention—

1. The combination with the two astatic needles and a pivotal support, of a connection between the needles extending laterally, an arm for indicating the extent of movement and a case or support for the pivot open between the astatic needles for allowing the ammeter to be applied with the needles at the opposite sides of a stationary conductor, substantially as set forth.

2. The combination with the astatic needles and an indicating-arm extending out from one of the needles, of an arch connection between the needles and beneath the arm, a counterweight at the opposite side of the pivot to the arm and a support for the pivot that allows the astatic needles to be applied above and below a stationary conductor, substantially as set forth.

3. The combination with the astatic needles and an indicating-arm extending out from one of the needles, of an arch connection between the needles and beneath the arm, a counterweight at the opposite side of the pivot to the arm and a yoke for supporting the pivots and an inclosing case open between the needles for allowing the instrument to be applied to a stationary conductor, substantially as set forth.

4. The astatic needles, a pivot for the upper needle, an arch connecting the upper and lower needles, and an indicating-arm in combination with an inclosing case having a recess that allows the case to be applied to a conductor so that the conductor is between the astatic needles, and a magnet for returning the needles to a normal position, substantially as set forth.

Signed by me this 28th day of June, 1897.

T. W. VARLEY.

Witnesses:
GEO. T. PINCKNEY,
S. T. HAVILAND.